No. 666,793. Patented Jan. 29, 1901.
C. C. BENSON.
COMBINED MINER'S COOKING STOVE, WHEELBARROW, AND SLED.
(Application filed Sept. 27, 1900.)
(No Model.)
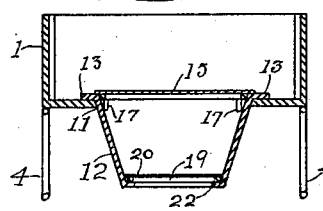
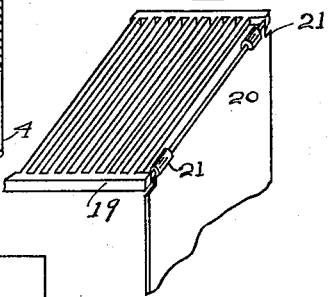
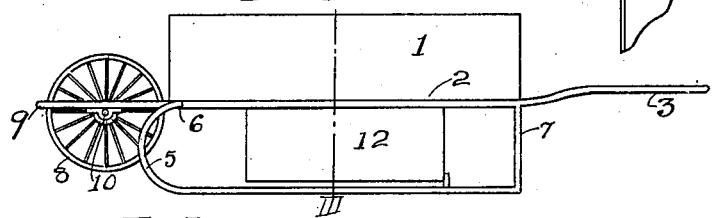
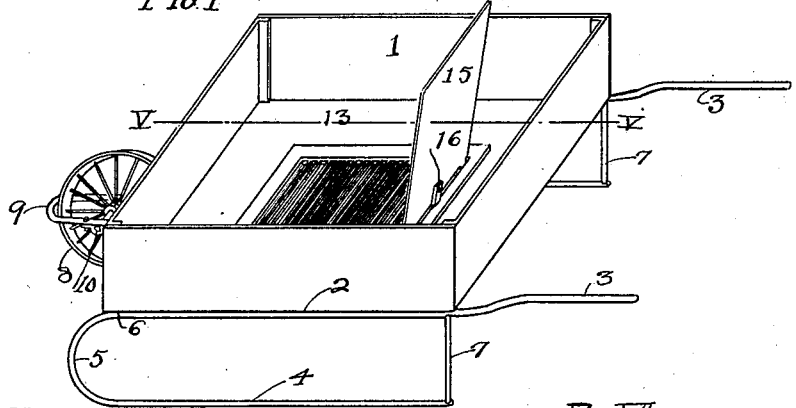
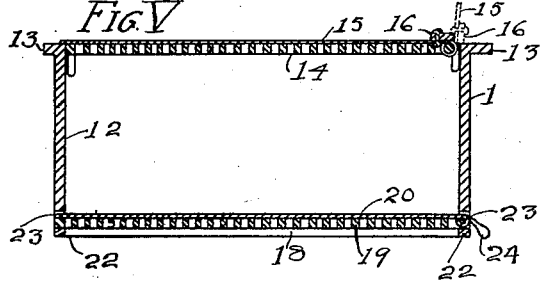
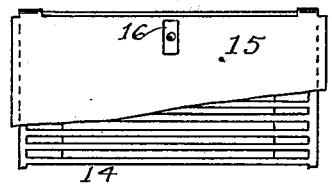
WITNESSES:
Ernest R. Creeth.
M. H. Knight.
INVENTOR
C. C. Benson.
BY Knight Bros.
ATTORNEYS.
THE NORRIS PETERS CO., PHOTO-LITHO., WASHINGTON, D. C.

UNITED STATES PATENT OFFICE.

CHARLES COLEMAN BENSON, OF SAN DIEGO, CALIFORNIA.

COMBINED MINER'S COOKING-STOVE, WHEELBARROW, AND SLED.

SPECIFICATION forming part of Letters Patent No. 666,793, dated January 29, 1901.

Application filed September 27, 1900. Serial No. 31,339. (No model.)

*To all whom it may concern:*

Be it known that I, CHARLES COLEMAN BENSON, a subject of the Queen of Great Britain, residing at San Diego, in the county of San Diego and State of California, (with post-office address at 1467 Fourth street, in said city,) have invented certain new and useful Improvements in a Combined Miner's Cooking-Stove, Wheelbarrow, and Sled, of which the following is a full, clear, and exact description, reference being had to the accompanying drawings, which form a part of this specification.

My invention relates to improvements in a combined miner's cooking-stove, wheelbarrow, and sled; and my invention consists in certain features of novelty hereinafter described and claimed.

Figure I is a perspective view of my improved device. Fig. II is a side elevation. Fig. III is a transverse section taken on line III III, Fig. II. Fig. IV is an enlarged detail perspective view of the bottom grate and plate. Fig. V is a transverse section taken on line V V, Fig. I. Fig. VI is a detail top view of the upper grate and folded plate.

Referring to the drawings, 1 represents the hopper or body of the wheelbarrow, having a side frame 2, with rear extensions 3, forming the handles of the wheelbarrow.

4 represents runners, curved at 5 and having their upper forward ends secured to the frame 2 at 6, or the runners, the frame, and the handle may be of one piece, if found desirable. I preferably use gas-pipe for this purpose.

7 represents vertical legs at the rear end of the hopper, said legs connecting the rear end of the runners 4 with the frame 2 and may be made of one piece with the frame, if found desirable.

8 represents the wheel of the wheelbarrow, journaled to a frame 9 at 10, said wheel being set so that its lowest point is somewhat above the runner 4, in order not to interfere when the device is being used as a sled. The hopper 1 of the wheelbarrow is provided with a central aperture 11, into which is set a pot 12 of a stove.

13 represents a flange extending around the upper edge of the pot, said flange resting upon the bottom of the hopper, (see Fig. III,) the hopper being preferably formed of metal, so as not to be affected by heat from the stove.

14 represents a grate set into the top of the stove-pot, and 15 represents a sheet-metal plate which is adapted to fold over the grate 14 when the device is being used for conveying material or in performing certain kinds of cooking in which an open grate would not be desirable. When it is desired to use the open grate, the plate 15 may be folded back, as shown in Fig. I, there being a lug 16 to limit its backward movement.

17 represents legs on the grate, on which the same may rest when removed from the stove-pot. The bottom of the pot 12 is open, as shown at 18, to permit the discharge of ashes from a lower grate 19.

20 represents a plate hinged at 21 to the bottom grate 19 and adapted to fold upon the same, as shown in Fig. V, when the grate 19 is not in operation, thus forming a solid bottom for the stove-pot when such is required.

22 represents a flange at the bottom of the pot 12, upon which the grating 19 rests, there being slots 23 at the ends of the pot into which the grating and plate may be inserted or withdrawn when so desired. When the grate 19 is in use as a stove, the plate 20 may be turned back, as shown in Fig. IV, the lower end of the plate hanging down or resting upon the ground, it being obvious that when the device is being used as a stove it will remain stationary. Then when it is desired not to use the grate it may be withdrawn and the plate folded down upon the same and again inserted in the pot, as shown in Fig. V.

24 represents a pendent catch or handle for securing or withdrawing the grate 19.

I claim as my invention—

1. In a device of the kind described, the combination of a hopper having a central aperture, a flange, a stove-pot set into the hopper, a grating at the top of the stove-pot and a hinged plate adapted to fold down upon said grating, suitable runners secured to the hopper and a wheel having connection with the hopper, substantially as set forth.

2. In a device of the kind described, the combination of the hopper, a wheel, the runners, an aperture in the hopper, a stove-pot adapted to be placed in said aperture, a flange at the lower end of the stove-pot, a grating, a plate hinged to the grating and adapted to fold thereon and slots in the hopper for receiving said grating and plate, substantially as set forth.

CHARLES COLEMAN BENSON.

Witnesses:
W. J. WOLFF,
CHARLES B. MALLORILL.